(12) United States Patent
Cho et al.

(10) Patent No.: US 8,811,215 B2
(45) Date of Patent: Aug. 19, 2014

(54) APPARATUS AND METHOD FOR DETECTING SIGNAL IN SPATIAL MULTIPLEXING SYSTEM

(75) Inventors: Yong-Soo Cho, Seoul (KR); Tae-Ho Im, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 129 days.

(21) Appl. No.: 13/452,671

(22) Filed: Apr. 20, 2012

(65) Prior Publication Data

US 2012/0263080 A1     Oct. 18, 2012

Related U.S. Application Data

(63) Continuation of application No. PCT/KR2010/007217, filed on Oct. 21, 2010.

(30) Foreign Application Priority Data

Oct. 21, 2009  (KR) .................... 10-2009-0100408

(51) Int. Cl.
*H04L 12/26* (2006.01)
*H04B 7/06* (2006.01)
*H04B 7/08* (2006.01)
*H04B 7/04* (2006.01)

(52) U.S. Cl.
CPC ............ *H04B 7/0697* (2013.01); *H04B 7/0617* (2013.01); *H04B 7/0848* (2013.01); *H04B 7/0434* (2013.01)
USPC .......................... 370/252; 370/255; 370/310

(58) Field of Classification Search
USPC ......... 370/203–211, 212, 213, 215, 241, 248, 370/252, 255, 310
See application file for complete search history.

(56) References Cited

U.S. PATENT DOCUMENTS

2009/0129456 A1*  5/2009  Miyatani ...................... 375/232

* cited by examiner

*Primary Examiner* — Yemane Mesfin
*Assistant Examiner* — Mon Cheri Davenport
(74) *Attorney, Agent, or Firm* — Edwards Wildman Palmer LLP; Kongsik Kim; Jonathan P. Western

(57) ABSTRACT

Disclosed are an apparatus and a method for detecting signals in a spatial multiplexing system. An embodiment of the invention provides a signal detection apparatus for a single receiver unit equipped with a plurality of antennas in a system having at least one transmitter unit configured to transmit data streams by spatial multiplexing, where the signal detection apparatus includes: a partial linear coefficient generator unit configured to generate a linear weighting matrix by using a preset algorithm on a channel matrix formed between the transmitter unit and the single receiver unit; a partial symbol remover unit configured to generate a first symbol vector by removing all transmittable symbols for each transmitting antenna from all received data streams; and a partial symbol detector unit configured to generate a transmission symbol candidate vector by using the linear weighting matrix and the first symbol vector.

17 Claims, 9 Drawing Sheets

APPARATUS AND METHOD FOR DETECTING SIGNAL IN SPATIAL MULTIPLEXING SYSTEM

CROSS-REFERENCE TO RELATED APPLICATIONS

This application is a continuation of PCT/KR2010/007217 filed on Oct. 21, 2010, which claims priority to Korean Patent Application No. 10-2009-0100408 filed on Oct. 21, 2009, which applications are incorporated herein by reference.

TECHNICAL FIELD

The present invention relates to an apparatus and a method for detecting signals in a spatial multiplexing system, more particularly to an apparatus and a method for detecting signals which lower complexity without incurring large differences in error performance, even when using a single receiver unit to receive a multiple number of different data streams transmitted by spatial multiplexing.

BACKGROUND ART

In order to maximize spectrum efficiency and transmission speed in a wireless communication system, there is an ongoing effort to apply MIMO (multi-input multi-output) technology to systems. There have been many cases recently in which MIMO technology hitherto mentioned only in theory was applied to actual systems to increase system performance. MIMO technology was employed in the recently commercialized IEEE 802.16e mobile-WiMAX system, as well as in the LTE system and IEEE 802.16m system, representative of 4G technology. However, since MIMO technology requires multiple antennas in the transmitter and is difficult to apply when the transmission power is low, it was not easy to use the MIMO technology for the up-link of a mobile terminal.

Recently, collaborative spatial multiplexing, which applies MIMO transmission such that multiple transmitters having one or two antennas operate as if one transmitter were using multiple antennas so as to provide a MIMO effect, was employed for the up-link of WiMAX, LTE, and IEEE 802.16m.

Collaborative spatial multiplexing (CSM) is a technique in which multiple terminals each having one or more transmitting antennas in a multi-user up-link system are allotted frequency resources to transmit data simultaneously.

Collaborative spatial multiplexing provides the advantages of increasing transmission efficiency of the system while decreasing the number of antennas in relation to the number of MIMO terminals, for lower complexity and hence lower costs in manufacturing terminals. Also, when collaborative spatial multiplexing is used in the up-link of a multi-user MIMO system, each user has an independent MCS (modulation and coding scheme) level, so that AMC (adaptive modulation and channel coding) is suitably performed in consideration of the users' channel statuses and QoS (quality of service). These procedures ensure a similar error performance between each user.

Collaborative spatial multiplexing in a multi-user system can thus increase transmission efficiency by transmitting the data streams for multiple users over the same resources, but since the transmission signals of all multi-users are collectively received at each receiving antenna of a base station, it is necessary to separate the spatially multiplexed signals at the base station.

Since collaborative spatial multiplexing involves operating multiple transmitters as if one transmitter were using multiple antennas, it can consider signal detection techniques for existing spatial multiplexing MIMO systems. Signal detection techniques for the receiver unit of a MIMO system using spatial multiplexing can be classified into linear signal detection techniques, non-linear signal detection techniques, quasi-optimal signal detection techniques, and optimal signal detection techniques.

ZF (zero-forcing) and MMSE (minimum mean square error) signal detection techniques, which are linear signal detection techniques, entail a low level of computational complexity and thus can be implemented in relatively simpler structures, but provide much lower performance compared to optimal signal detection techniques. Signal detection techniques of the OSIC (ordered successive interference cancellation) type, which are non-linear signal detection techniques, involve successively removing the detection signals according to a predetermined order of detection so as to reduce the effect of interference signals.

Signal detection techniques of the OSIC type entail higher levels of computational complexity compared to linear signal detection techniques, but provide higher performance compared to linear signal detection techniques. The performance, however, is much lower compared to optimal signal detection methods, which provide the most optimal performance. The ML (maximum likelihood) signal detection technique, which provides optimal performance, is to detect signals by substituting the candidate vector values of all transmittable signals to compute and compare squared Euclidean distances and selecting the minimum squared Euclidean distance. As such, increases in the number of transmitted data streams and in the order of modulation result in exponential increases in computational complexity, and hence these techniques entail very high computational complexity. Signal detection techniques that reduce the high computational complexity of the ML signal detection technique while maintaining a performance level similar to the optimal performance include QRM-MLD (maximum likelihood detection with QR decomposition), SD (sphere decoding), etc. The SD technique is to compute the squared Euclidean distance by substituting symbols of constellations existing within a limited distance. While this can significantly reduce the average complexity compared to the ML technique, it is a depth-first searching method, so that the maximum complexity cannot be predicted, and it is difficult to apply in real-life implementations.

Unlike the SD technique, QRM-MLD is a breadth-first search having a fixed maximum complexity. While this technique can provide almost the same level of performance as the ML signal detection technique if there are a sufficient number of candidate vectors, the performance is greatly reduced if there are a small number of candidate vectors.

Among the existing signal detection methods described above, non-linear detection techniques of the OSIC type and quasi-optimal signal detection techniques such as QRM-MLD and SD may entail differences in performance between different data streams, due to error propagation in the signal detection process, limitations concerning the substituted symbols, or limitations concerning the symbol candidate vectors. In the case of OSIC type signal detection techniques, when a previously detected symbol was erroneously detected in a process involving sequential detection of signals, error propagation may occur. This may cause a difference in signal detection performance between data streams. In the case of SD and QRM-MLD, the symbols that are transmittable over a data stream are limited and substituted in the process of detecting signals, and the squared Euclidean distances are generated using only the candidate symbols. Thus, similar to the OSIC technique, differences in signal detection performance may occur between data streams for SD and QRM-MLD as well. Signal detection techniques that generate such phenomena are unsuitable for application to collaborative spatial multiplexing. As described above, a multi-user MIMO system planning to use collaborative spatial multiplexing in its up-link is configured such that the error performance is similar for each user in consideration of the users' channel environments and QoS, but if an existing signal detection method were to be used which generates large differences in signal detection performance between data streams, then the configuration of MCS level would be useless. As such, existing non-linear detection techniques of the OSIC type and quasi-optimal signal detection techniques such as QRM-MLD, SD, etc., in which the error performances between data streams are affected by error propagation during the signal detection process and limitations in the signal detection algorithms, are not suitable for a multi-user MIMO system using collaborative spatial multiplexing.

SUMMARY OF THE DISCLOSURE

To resolve the problems in the related art described above, an aspect of the present invention is to propose an apparatus and a method for detecting signals in a spatial multiplexing system with which there are no large differences in error performance generated during the signal detection of data streams at the receiver unit equipped with multiple antennas, when the data streams are transmitted by spatial multiplexing from a single transmitter unit having multiple antennas or from multiple transmitter units equipped with at least one antenna.

Another objective of the present invention is to provide an apparatus and a method for detecting signals in a spatial multiplexing system that display a performance level similar to that of the ML signal detection technique, which is an optimal signal detection technique, when making a hard decision or a soft decision, without incurring a high level of complexity.

Yet another objective of the present invention is to provide an apparatus and a method for detecting signals in a spatial multiplexing system with which the error performance levels are similar between different data streams.

To achieve the objectives above, a preferred embodiment of the invention provides a signal detection apparatus for a single receiver unit equipped with a plurality of antennas in a system having at least one transmitter unit configured to transmit data streams by spatial multiplexing, where the signal detection apparatus includes: a partial linear coefficient generator unit configured to generate a linear weighting matrix by using a preset algorithm on a channel matrix formed between the transmitter unit and the single receiver unit; a partial symbol remover unit configured to generate a first symbol vector by removing all transmittable symbols for each transmitting antenna from all received data streams; and a partial symbol detector unit configured to generate a transmission symbol candidate vector by using the linear weighting matrix and the first symbol vector.

The partial linear coefficient generator unit can include a column matrix remover unit configured to generate M−1 partial matrices (where M is a total number of antennas of the at least one transmitter unit) by removing each column matrix of the channel matrix; and a linear weighting matrix generator unit configured to generate the linear weighting matrix by applying the partial matrices to the preset algorithm.

The partial linear coefficient generator unit can generate the linear weighting matrix by using at least one of a ZF (zero-forcing) algorithm and an MMSE (minimum mean square error) algorithm.

The partial symbol remover unit can select a transmittable symbol of an i-th transmitting antenna, multiply the selected symbol with a column matrix corresponding to the i-th transmitting antenna from among the channel matrix, and remove the multiplied value from all of the data streams.

The partial symbol remover unit can select a number of symbols corresponding to a modulation order of a data stream in the i-th transmitting antenna.

The partial symbol remover unit can remove all transmittable symbols for each transmitting antenna according to the equations shown below:

$$\overline{y}_i(k) = y - h_i C_i(k), i = 1, 2, 3, 4, k = 1, 2, \cdots, |C_i|,$$

$$h_i = \begin{bmatrix} h_{1i} \\ h_{2i} \\ h_{3i} \\ h_{4i} \end{bmatrix}$$

Here, i is an index for a transmission symbol, k is an index for a modulation order $C_i$, and $\overline{y}_i(k)$ is a symbol vector with a k-th symbol removed from all symbols transmittable over an i-th transmitting antenna in all of the data streams.

The partial symbol detector unit can multiply the linear weighting matrix with the first symbol vector to detect a second symbol vector, which corresponds to the symbols remaining after the partial symbol remover unit removes symbols for an i-th transmitting antenna.

The partial symbol detector unit can detect the second symbol vector for each transmitting antenna according to the equations shown below:

$$\hat{x}_{p,i}(k) = H_i^+ \overline{y}_i(k), i=1,2,3,4, k=1,2,\ldots,|C_i|$$

$$\hat{x}_{p,i}(k) = [\hat{x}_{p,1,1}(k) \hat{x}_{p,1,2}(k) \hat{x}_{p,1,3}(k)]$$

Here, $\hat{x}_{p,i}(k)$ is a symbol vector remaining after removing a symbol k that is transmittable over an i-th transmitting antenna.

The partial symbol detector unit can generate a transmission symbol candidate vector by adding the first symbol vector and second symbol vector.

The partial symbol detector unit can select a modulation slicer corresponding to a modulation order of a data stream for each transmitting antenna.

The signal detection apparatus according to an embodiment of the invention can further include a squared Euclidean distance computing unit configured to perform a preset number of squared Euclidean distance computations by using the generated transmission symbol candidate vector.

The squared Euclidean distance computations can be performed according to the equations shown below:

$$\mathrm{SED}_i(k) = \|y - H\hat{x}_i(k)\|^2, i=1,2,3,4, k=1,2,\ldots,|C_i|$$

The signal detection apparatus according to an embodiment of the invention can further include a minimum squared Euclidean selector unit configured to determine a transmission candidate symbol vector having a shortest distance value from among a preset number of squared Euclidean distances as a transmission symbol according to equations shown below, during a hard decision:

$$\hat{x} = \arg\min_{x \in \hat{x}_i(k)} \|y - Hx\|^2$$

The signal detection apparatus according to an embodiment of the invention can further include a bit LLR generator unit configured to generate LLR (log-likelihood ratio) values of all bits of the transmission symbol candidate vector, during a soft decision.

The generated LLR values can be transferred to a channel decoder, where the channel decoder can include at least one of a Viterbi decoder and a turbo decoder.

An input of the signal detection apparatus can include at least one of a channel gain, stream data received at each of the plurality of antennas, and an estimated noise variance value.

The one or more transmitter unit can be a single transmitter unit having an M number of antennas (M is a natural number of 2 or more) or multiple transmitter units each having one or more antennas and having an M number of antennas in total.

Another aspect of the invention provides a signal detection apparatus for a single receiver unit equipped with a plurality of antennas in a system having at least one transmitter unit configured to transmit data streams by spatial multiplexing, where the signal detection apparatus includes a partial symbol remover unit configured to generate a symbol vector having all transmittable symbols removed for each transmitting antenna from all received data streams, and where the partial symbol remover unit generates the symbol vector by selecting a transmittable symbol of an i-th transmitting antenna, multiplying the selected symbol with a column matrix corresponding to the i-th transmitting antenna from among the channel matrix, and removing the multiplied value from all of the data streams.

Yet another aspect of the invention provides a method of detecting signals for a single receiver unit equipped with a plurality of antennas in a system having at least one transmitter unit configured to transmit data streams by spatial multiplexing, where the method includes: (a) generating a linear weighting matrix by using a preset algorithm on a channel matrix formed between the at least one transmitter unit and the single receiver unit; (b) generating a first symbol vector by removing all transmittable symbols for each transmitting antenna from all received data streams; (c) generating a transmission symbol candidate vector by using the generated linear weighting matrix and the first symbol vector; and (d) computing a squared Euclidean distance by using the generated transmission symbol candidate vector.

According to certain embodiments of the invention, the partial symbol remover unit may apply a symbol removal procedure once for all data streams, and the partial symbol detector unit may be applied to each data stream, so that all data streams have similar differences in error performance.

DETAILED DESCRIPTION OF THE DISCLOSURE

Figure 1:
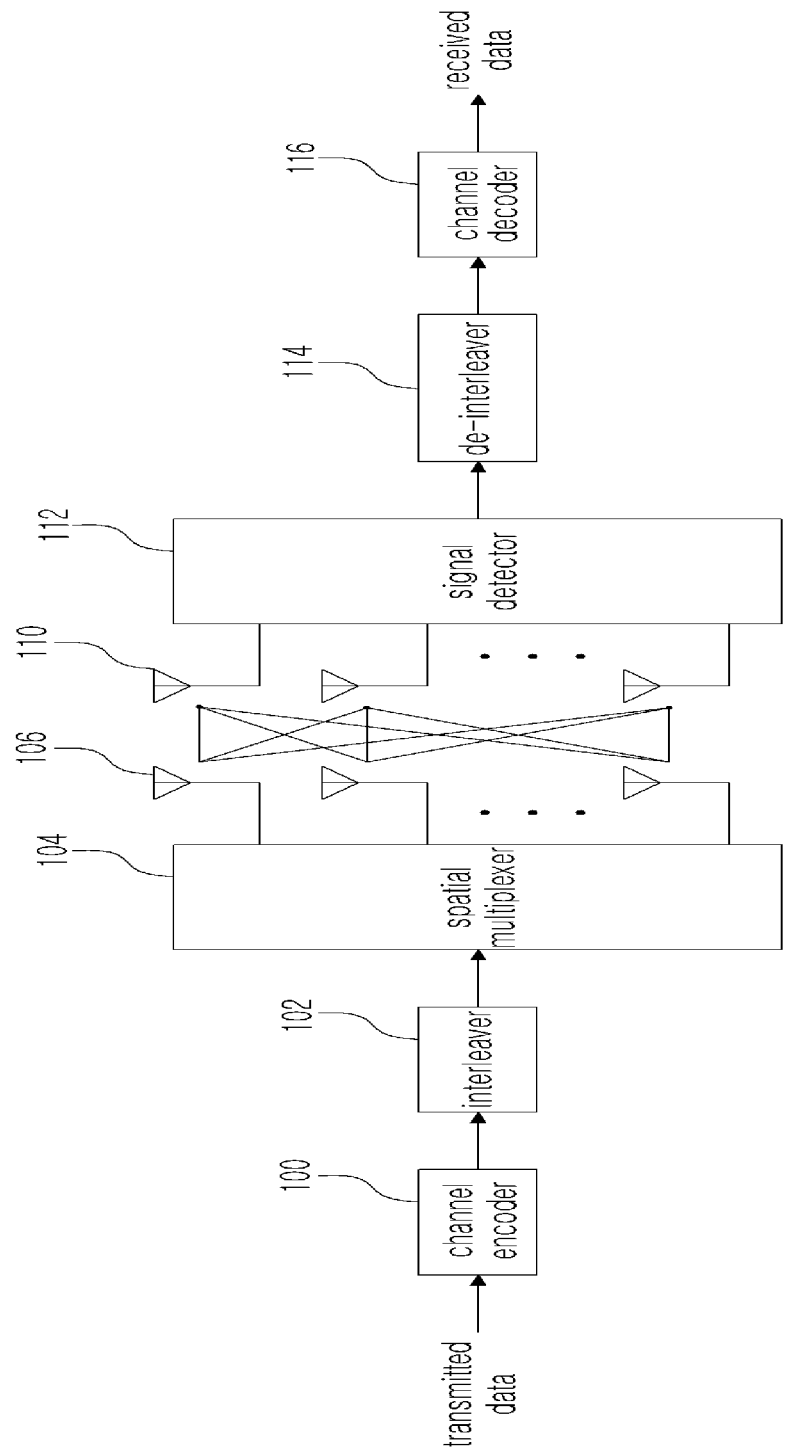
FIG. 1 is a block diagram of the transmitter unit and receiver unit of a typical MIMO system.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like numerals are used to refer to like elements.

Unless otherwise defined, all terms used herein, including technical or scientific terms, have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present application.

Certain embodiments of the invention will be described below in more detail with reference to the accompanying drawings. For better understanding, the same elements are indicated by the same numerals regardless of the figure number.

The invention provides a method by which a single receiver unit (e.g. a base station) having an N number of antennas can optimally detect signals, in a system where there are a total of M antennas on a single transmitter unit equipped with multiple antennas or on multiple transmitter units (e.g. terminals) equipped with at least one antenna, and where the data streams are sent by spatial multiplexing.

In particular, the invention can be applied to signal detection in a collaborative spatial multiplexing (CSM) up-link system, which describes a multi-user up-link system where multiple terminals each having one or more transmitting antenna are allotted with frequency resources to send data simultaneously. The following descriptions will be provided focusing mainly on signal detection in a collaborative spatial multiplexing up-link system.

A collaborative spatial multiplexing system can be expressed mathematically as a typical MIMO system including one transmitter unit having M antennas and one receiver unit having N antennas.

Figure 2:
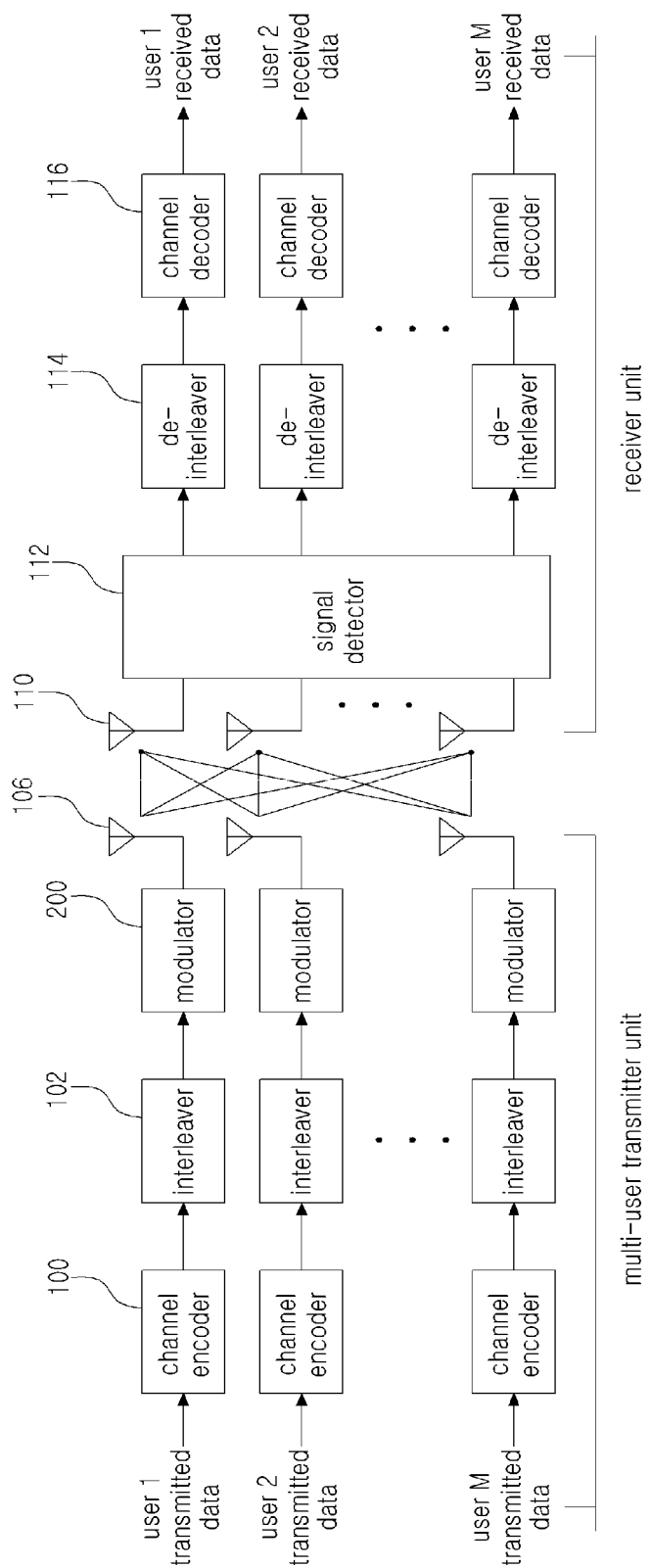
FIG. 2 is a block diagram of a collaborative spatial multiplexing system.

With reference to FIGS. 1 and 2, a description will first be provided of a system to which the present invention can be applied and of existing signal detection techniques.

FIG. 1 is a block diagram of the transmitter unit and receiver unit of a typical MIMO system.

As illustrated in FIG. 1, the transmitter unit of a typical MIMO system can include a channel encoder 100, an interleaver 102, a spatial multiplexer 104, and multiple antennas 106, while the receiver unit can include multiple antennas 110, a signal detector 112, a de-interleaver 114, and a channel decoder 116.

A data stream being sent may pass through the channel encoder 100 and the interleaver 102, after which the spatial multiplexer 104 may send symbols having different values through each of the antennas 106.

At the receiver unit, each of the antennas 110 may receive wireless signals that have passed through different channel environments. The received signals may be multiple signals having passed through different channel environments, and may be separated by the signal detector 112 after channel estimation.

During signal detection, when using a hard decision, the bits of each symbol are detected by demodulating the detected symbols, and when using a soft decision, the bits of the hard-decision symbols are detected as the bit LLR (log-likelihood ratio) information of the detected symbols proceeds through the de-interleaver 114 and the channel decoder 116.

FIG. 2 is a block diagram of a collaborative spatial multiplexing system.

FIG. 2 illustrates the basic concept of a collaborative spatial multiplexing system, in which data streams after channel encoding are sent by multiple transmitter units, and data streams are received by one receiver unit using multiple antennas.

In a collaborative spatial multiplexing system, if the total number of antennas in the multiple transmitter units is equal to the number of antennas in the spatial multiplexing MIMO system described in FIG. 1, and if the number of antennas on the receiver units are equal, then the relationships between transmitted and received signals for the collaborative spatial multiplexing system can be expressed by the same equations as those of the spatial multiplexing MIMO system.

However, each transmitter unit in the collaborative spatial multiplexing system includes an independent modulator 200-1 to 200-M instead of the spatial multiplexer.

Assuming a spatial multiplexing MIMO system in which the number of transmitting antennas is M and the number of receiving antennas is N, the relationships between the wireless communication channel and the transmitted and received signals can be represented by Equation 1 as shown below.

$$y = Hx + z,$$
$$y = [y_1\ y_2\ \cdots\ y_N]^T,$$
$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix},$$
$$x = [x_1\ x_2\ \cdots\ x_M]^T,$$
$$z = [z_1\ z_2\ \cdots\ z_N]^T \quad \text{[Equation 1]}$$

Here, $x_j$ represents the signal (symbol) transmitted from the j-th transmitting antenna, $y_j$ represents the signal received at the j-th receiving antenna, and $h_{ij}$ represents the channel gain between the j-th transmitting antenna and the i-th receiving antenna. Noise $z_i \sim CN(0,\sigma_2^2)$ is assumed to be circularly-symmetric Gaussian white noise. The transmission symbol $x_j$ is assumed to be a QAM (quadrature amplitude modulation) modulated symbol, and it is assumed that there is perfect channel estimation at the receiver, so that the channel information is known. In the collaborative spatial multiplexing system, it is assumed that the transmission symbols are each sent over different transmitting antennas.

The ML technique, which detects signals with optimal performance, calculates the squared Euclidean distances for every transmittable transmission signal vector, and in the case of a hard decision, determines the transmission signal vector corresponding to the minimum value as the transmission symbol. In the case of a soft decision, the squared Euclidean distances generated using all transmittable transmission signal vectors are used to generate bit LLRs, which are applied to MAP, log-MAP, max-log-MAP methods to detect symbols. The ML signal detection technique can be expressed by Equation 2 shown below.

$$\hat{x}_{ML} = \arg\min_{x \in C^M} \|y - Hx\|^2 \quad \text{[Equation 2]}$$

If there are an M number of transmitting and receiving antennas each, and ML signal detection is to be performed using the above equation for symbols modulated by C-QAM, then the number of computations of squared Euclidean distance is $|C|^M$. Since the amount of computation for the ML signal detection technique increases exponentially according to the number of transmitting antennas with respect to the modulation order (C), it is difficult to apply to an actual system.

The ZF and MMSE techniques, which are linear techniques and can be implemented with a small amount of computation, utilize inverse functions of channels, and in the case of the ZF technique, there are occurrences of a noise amplification phenomenon. The MMSE technique is developed in consideration of the noise amplification phenomenon found in the ZF technique, and displays improved performance compared to the ZF technique. However, it still has a significantly lower performance compared to optimal performance. The ZF and MMSE techniques can be expressed by Equation 3 shown below.

$$ZF: \hat{x} = H_{ZF}^+(Hx+z), H_{ZF}^+ = (H^H H)^{-1} H^H$$
$$MMSE: \hat{x} = H_{MMSE}^+(Hx+z), H_{MMSE}^+ = (H^H H + \sigma^2 I_M)^{-1} H^H \quad \text{[Equation 3]}$$

Here, $H^+$ represents a linear weighting matrix, $H^H$ represents a conjugate transpose matrix, and $\sigma^2$ represents the noise power when transmission power is 1. Also, $I_M$ represents an M×M unit matrix. The ZF technique is an algorithm for removing interference signals by finding a pseudo inverse matrix of the channel response without considering noise, and the MMSE technique is an algorithm that considers noise and allows the demodulated signals to have the maximum signal-to-noise ratio.

While a MIMO system may use the ZF and MMSE techniques for detecting spatially multiplexed signals, as described above, these display greatly lower performance compared to the ML technique, which is an optimal signal detection technique that can be implemented with a relatively simple structure.

According to a preferred embodiment of the invention, a signal detection method is proposed that can provide a performance comparable to the optimal signal detection technique without increasing the complexity.

Figure 3:
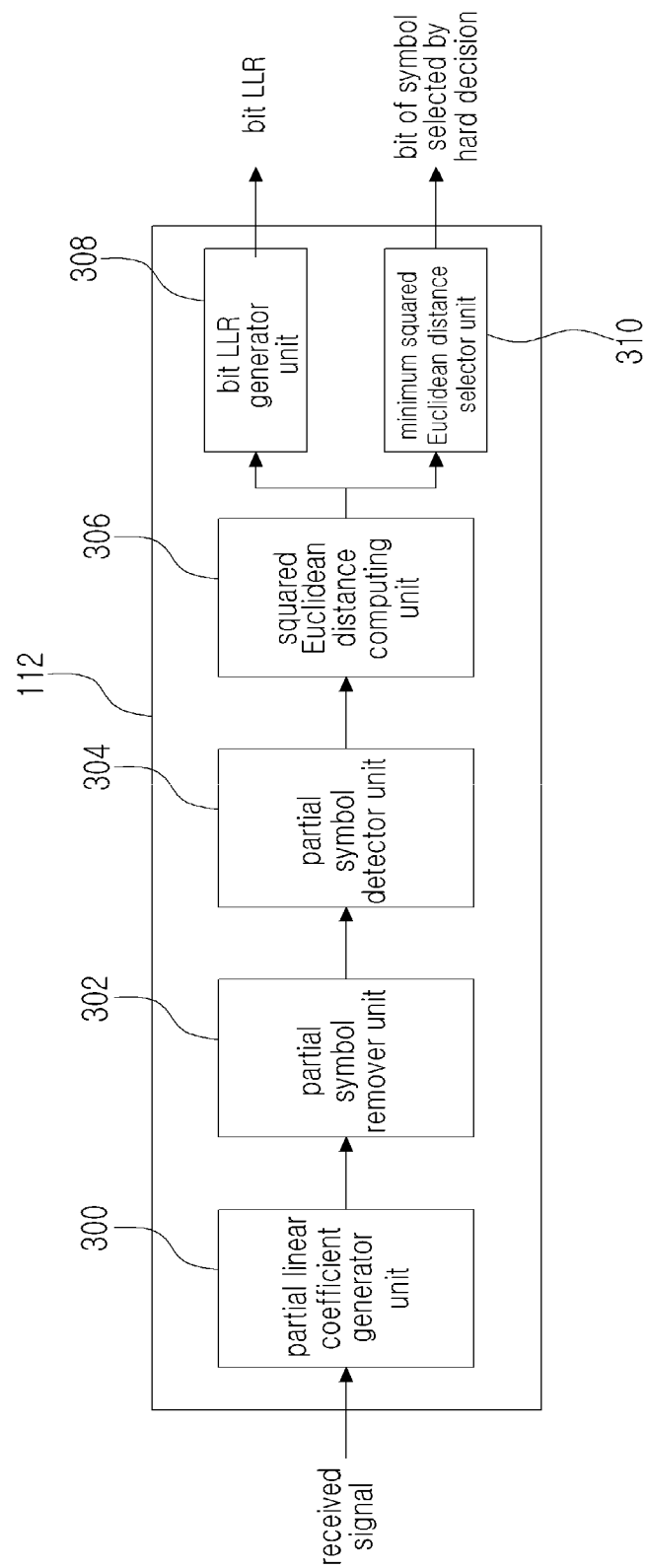
FIG. 3 is a block diagram of a signal detection apparatus according to a preferred embodiment of the invention.

FIG. 3 is a block diagram of a signal detection apparatus according to a preferred embodiment of the invention.

FIG. 3 relates to a signal detection apparatus (signal detector 112) included in a collaborative spatial multiplexing system such as that of FIG. 2. As illustrated in FIG. 3, a signal detection apparatus according to an embodiment of the invention can include a partial linear coefficient generator unit 300, a partial symbol remover unit 302, a partial symbol detector unit 304, a squared Euclidean distance computing unit 306, a bit LLR generator unit 308, and a minimum squared Euclidean selector unit 310.

In the following, the descriptions will be provided mainly using an example in which the total number (M) of antennas of the multiple transmitter units is 4, and in which the number (N) of antennas in the one receiver unit is 4.

In certain embodiments of the invention, the input for the signal detection apparatus may be channel gain values obtained by channel estimation, stream data received at each of the antennas, and information regarding the modulation order of each stream data.

The partial linear coefficient generator unit 300 according to an embodiment of the invention may serve to obtain linear coefficients (weights or a weighting matrix) beforehand by using the ZF or MMSE algorithm to be used by the partial symbol detector unit 304.

Here, if the ZF algorithm is used, the channel gain value, received stream data, and modulation order information may be used as the input, but if the MMSE algorithm is used, estimated noise variance values may be used as additional input.

Figure 4:
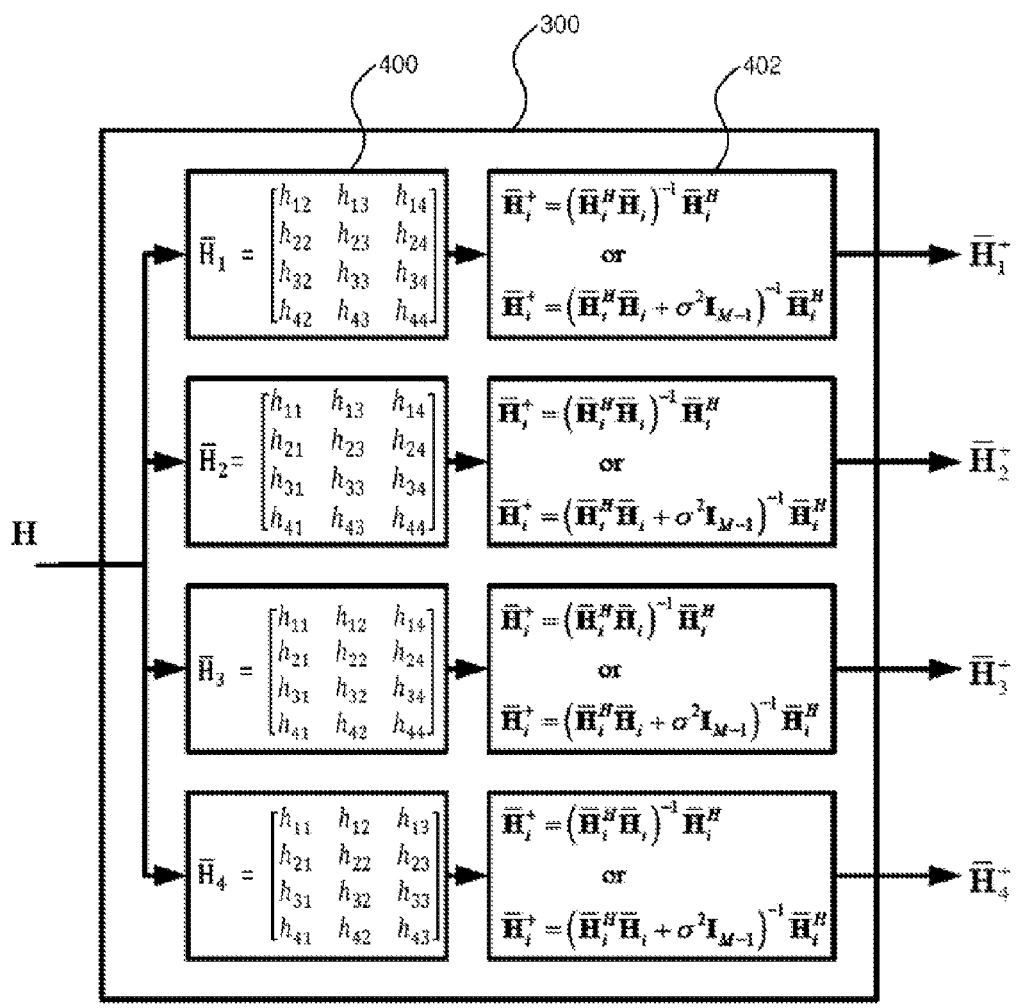
FIG. 4 is a detailed diagram of a partial linear coefficient generator unit according to an embodiment of the invention.

FIG. 4 is a detailed diagram of a partial linear coefficient generator unit 300 according to an embodiment of the invention.

As illustrated in FIG. 4, the partial linear coefficient generator unit 300 can include a column matrix remover unit 400 and a linear weighting matrix generator unit 402.

The column matrix remover unit 400 may remove each column matrix from the channel matrix defined by Equation 1 above.

Since M and N are both 4 in this embodiment of the invention, the channel matrix H is a 4×4 channel matrix, and the column matrix remover unit 400 may remove each column matrix to generate 3×4 partial matrices.

Using the four partial matrices thus generated, the linear weighting matrix generator unit 402 may generate linear weighting matrices as in Equation 3 by using a ZF or MMSE algorithm.

This can be expressed as Equation 4 below.

$$\overline{H}_1 = \begin{bmatrix} h_{12} & h_{13} & h_{14} \\ h_{22} & h_{23} & h_{24} \\ h_{32} & h_{33} & h_{34} \\ h_{42} & h_{43} & h_{44} \end{bmatrix}, \overline{H}_2 = \begin{bmatrix} h_{11} & h_{13} & h_{14} \\ h_{21} & h_{23} & h_{24} \\ h_{31} & h_{33} & h_{34} \\ h_{41} & h_{43} & h_{44} \end{bmatrix},$$

$$\overline{H}_3 = \begin{bmatrix} h_{11} & h_{12} & h_{14} \\ h_{21} & h_{22} & h_{24} \\ h_{31} & h_{32} & h_{34} \\ h_{41} & h_{42} & h_{44} \end{bmatrix}, \overline{H}_4 = \begin{bmatrix} h_{11} & h_{12} & h_{13} \\ h_{21} & h_{22} & h_{23} \\ h_{31} & h_{32} & h_{33} \\ h_{41} & h_{42} & h_{43} \end{bmatrix}$$

[Equation 4]

$$ZF: \overline{H}_i^+ = (\overline{H}_i^H \overline{H}_i)^{-1} \overline{H}_i^H, i = 1, 2, 3, 4$$

$$MMSE: \overline{H}_i^+ = (\overline{H}_i^H \overline{H}_i + \sigma^2 I_M)^{-1} \overline{H}_i^H, i = 1, 2, 3, 4$$

The linear weighting matrices generated in Equation 4 above may be used as input values for the partial symbol detector unit 304, and the partial symbol detector unit 304 may use the linear weighting matrices to detect transmission symbol candidate vectors.

Figure 5:
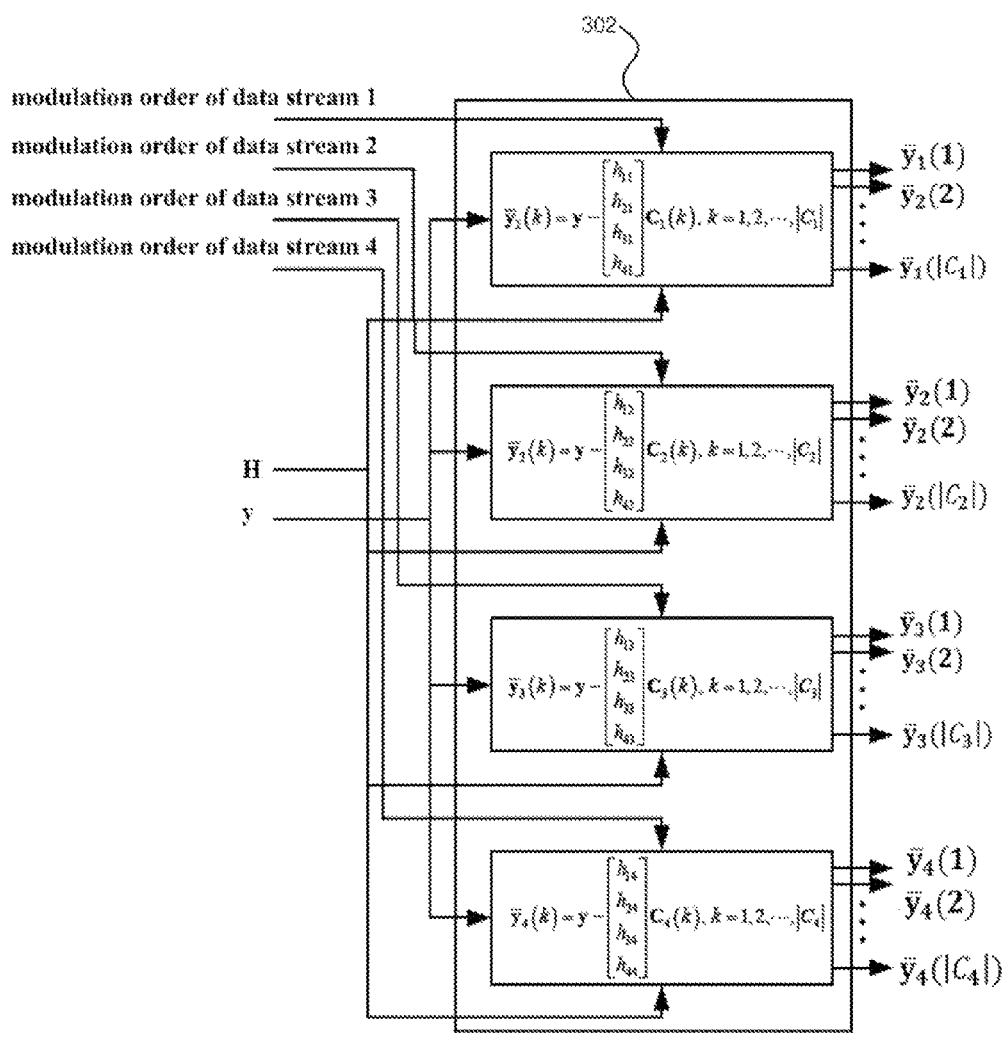
FIG. 5 is a detailed diagram of a partial symbol remover unit according to an embodiment of the invention.

FIG. 5 is a detailed diagram of a partial symbol remover unit according to an embodiment of the invention.

A partial symbol remover unit 302 according to an embodiment of the invention may serve to remove all transmittable symbols of particular stream data as in Equation 5 below. That is, the partial symbol remover unit 302 may receive all transmittable symbols of each transmitting antenna from all of the received data streams to generate first symbol vectors.

$$\overline{y}_i(k) = y - h_i C_i(k), i =$$

$$1, 2, 3, 4, k = 1, 2, \cdots, |C_i|,$$

$$h_i = \begin{bmatrix} h_{1i} \\ h_{2i} \\ h_{3i} \\ h_{4i} \end{bmatrix}.$$

[Equation 5]

Here, i is the index of the transmission symbol, and k is the index of the $C_i$ modulation order. $\overline{y}_i(k)$ is the symbol vector obtained by removing the k-th symbol from all transmittable symbols of the i-th transmitting antenna from all of the received data streams.

After removing the symbols, a partial symbol remover unit 302 according to an embodiment of the invention may output a $|C_1|$ number of first symbol vectors if i=1, a $|C_2|$ number of first symbol vectors if i=2, a $|C_3|$ number of first symbol vectors if i=3, and a $|C_4|$ number of first symbol vectors if i=4.

Figure 6:
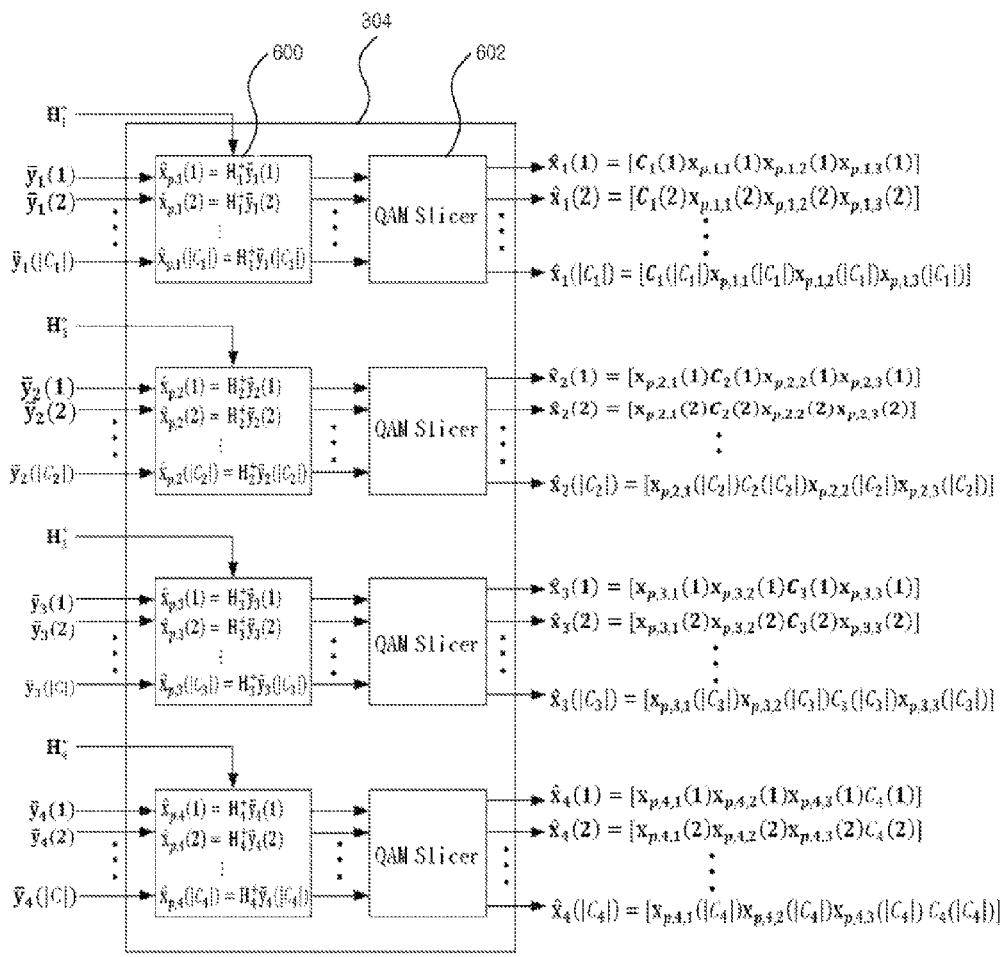
FIG. 6 is a detailed diagram of a partial symbol detector unit according to an embodiment of the invention.

FIG. 6 is a detailed diagram of a partial symbol detector unit according to an embodiment of the invention.

As illustrated in FIG. 6, a partial symbol detector unit 304 according to an embodiment of the invention may include a partial symbol vector generator unit 600 and a modulation slicer (QAM Slicer) 602, with which to generate transmission symbol candidate vectors.

The partial symbol vector generator unit 600 may multiply the linear weighting matrices generated at the partial linear coefficient generator unit 300 using the ZF or MMSE algorithm with the received signals having the transmittable symbols removed at the partial symbol remover unit 302, to generate vectors of the remaining symbols after symbol removal, i.e. partial symbol vectors (second symbol vectors).

The partial symbol vector generator unit 600 may select a modulation slicer corresponding to the modulation order of the data stream of each transmitting antenna.

Here, the detection of second symbol vectors can be expressed by Equation 6 shown below.

$$\hat{x}_{p,i}(k) = H_i^+ \overline{y}_i(k), i=1,2,3,4, k=1,2,\ldots,|C_i|$$

$$\hat{x}_{p,i}(k) = [\hat{x}_{p,1,1}(k)\hat{x}_{p,1,2}(k)\hat{x}_{p,1,3}(k)]$$

[Equation 6]

Here, $\hat{x}_{p,i}(k)$ is the value of the remaining symbol vector (second symbol vector) after removing transmittable symbol k from the i-th transmitting antenna.

The total number of partial symbol vectors generated is the sum of the magnitude of the modulation order of each transmitting antenna, and since the number (M) of transmitting antennas was assumed to be 4, the total number of partial symbol vectors is $$\sum_{i=1}^{M=4} |C_i|.$$

The partial symbol detector unit 304 may add the generated second symbol vectors with the first symbol vectors removed at the partial symbol remover unit 302 to generate an $$\sum_{i=1}^{M=4} |C_i|$$

number of transmission symbol candidate vectors $\hat{x}_i(k)$. The transmission symbol candidate vectors are as shown below in Equation 7.

$\hat{x}_1(k)=[C_1(k)x_{p,1,1}(k)x_{p,1,2}(k)x_{p,1,3}(k)], k=1,2,\ldots,|C_1|$ $\hat{x}_2(k)=[x_{p,2,1}(k)C_2(k)x_{p,2,2}(k)x_{p,2,3}(k)], k=1,2,\ldots,|C_2|$ $\hat{x}_3(k)=[x_{p,3,1}(k)x_{p,3,2}(k)C_3(k)x_{p,3,3}(k)], k=1,2,\ldots,|C_3|$ $\hat{x}_4(k)=[x_{p,4,1}(k)x_{p,4,2}(k)x_{p,4,3}(k)C_4(k)], k=1,2,\ldots,|C_4|$ [Equation 7]

Figure 7:
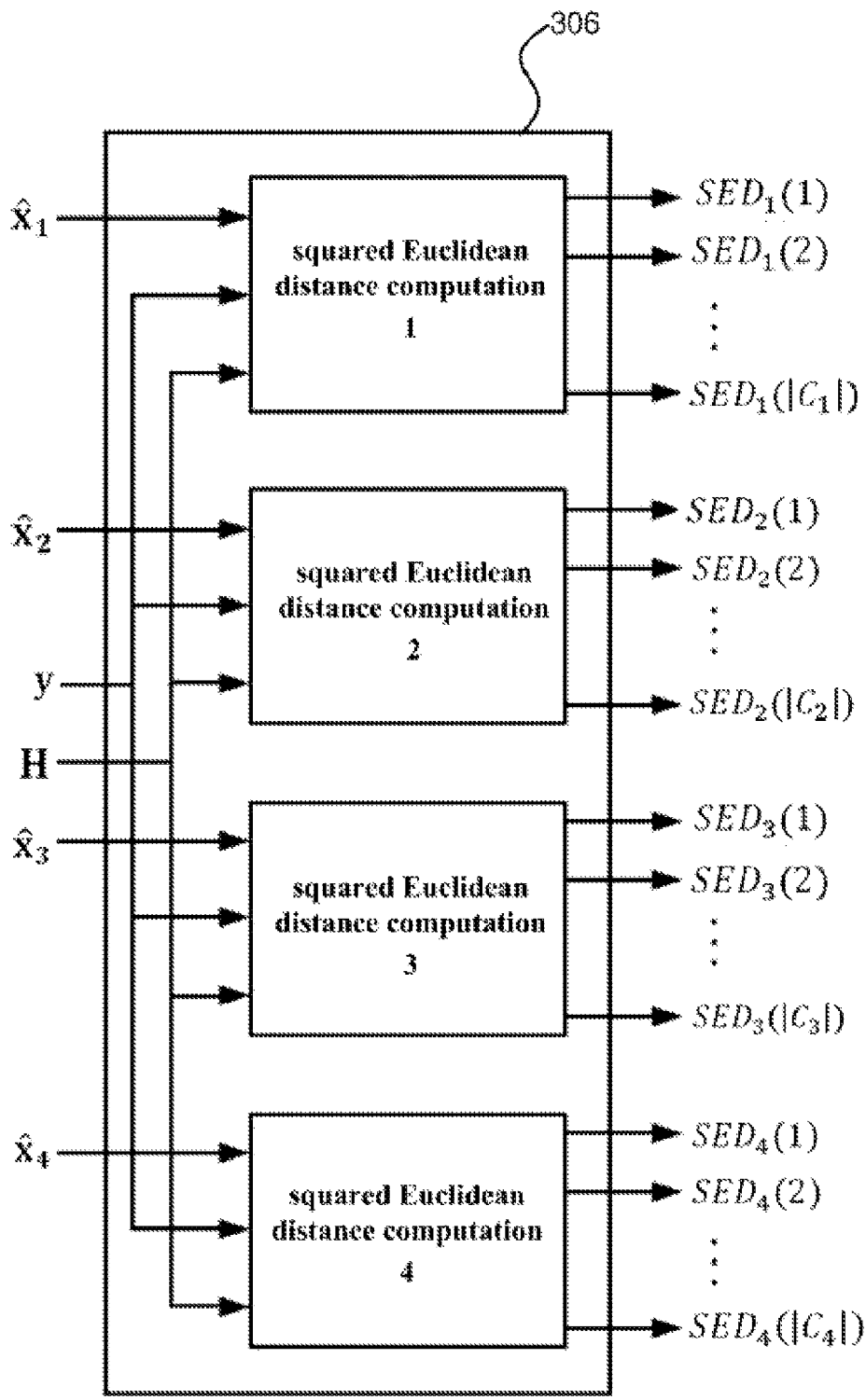
FIG. 7 is a detailed diagram of a squared Euclidean distance computing unit according to an embodiment of the invention.

FIG. 7 is a detailed diagram of a squared Euclidean distance computing unit according to an embodiment of the invention.

Referring to FIG. 7, the squared Euclidean distance computing unit 306 may compute the squared Euclidean distances as shown below in Equation 8 by using the transmission symbol candidate vectors generated at the partial symbol detector unit 304.

$SED_i(k)=\|y-H\hat{x}_i(k)\|^2, i=1,2,3,4, k=1,2,\ldots,|C_i|$ [Equation 8]

The $$\sum_{i=1}^{M=4} |C_i|$$

number of squared Euclidean distances $SED_i(k)$ computed in Equation 8 may be used in both a hard decision and a soft decision.

When making a hard decision, the minimum squared Euclidean selector unit 310 may determine the transmission symbol candidate vector having the shortest distance value, from among the $$\sum_{i=1}^{M=4} |C_i|$$

number of squared Euclidean distances $SED_i(k)$ generated as in Equation 9 below, as the transmission symbol.

$\hat{x} = \arg\min_{x \in \hat{x}_i(k)} \|y - Hx\|^2$ [Equation 9]

When making a soft decision, the bit LLR generator unit 308 may generate LLR values for all bits of the transmission symbol candidate vectors and transfer them to a channel decoder 116-*n*.

In an embodiment of the invention, it is assumed that the channel decoder 116-*n* is a Viterbi decoder and a turbo decoder.

The method of generating LLRs may use max-log approximation, and may be as shown below in Equation 10.

$LLR(b_{i,j}) = \min_{x \in S_{i,j,0}} SED - \min_{x \in S_{i,j,1}} SED,$ [Equation 10]

$i = 1, 2, 3, 4, j = \log_2 |C_i|,$ $SED = \{SED_i(k)\}, i = 1, 2, 3, 4, k = 1, 2, \cdots, |C_i|$ $S_{i,j,p} \cong \{x = map(b_1 \, b_2 \, \cdots \, b_{\log|C_i|}) | x \in \hat{x}_i(k), b_j = p\}$ As in Equation 10, $S_{i,j,b}$ may generate the LLR of the j-th bit of the i-th transmitting antenna by using the subset $S_{i,j,p}$ of $\hat{x}_i(k)$.

When using Equation 10, an existing QRM-MLD, sphere decoding (SD) signal detection technique may be faced with the problem of not being able to generate LLRs for all bits. Techniques for resolving this problem have been studied, including increasing the number of candidate vectors or using constant values, known as clipping. Increasing the number of candidate vectors increases computation complexity, while the clipping technique entails the problem of choosing an accurate clipping constant based on SNR or channel estimation error. If an in accurate constant value is used, the performance may be greatly degraded. Also, existing QRM-MLD, SD techniques entail great differences in variety between symbols included in the candidate vectors. That is, there occurs the phenomenon that the symbols detected in the early stages tend to be fixed to one or two of the several transmittable symbols in the final candidate symbol vector. Thus, there is a difference in performance for most of the transmittable symbols with respect to the lastly detected symbols existing in the final candidate symbol vector. With a signal detection technique subject to such phenomenon, a data stream having greatly degraded performance may adversely affect the performance of the overall system in a MIMO system using spatial multiplexing as described in FIG. 1 above. Also, in the case of a multi-user system using collaborative spatial multiplexing as described in FIG. 2 above, the signal detection technique can cause differences in performance between data streams of several users.

Figure 8:
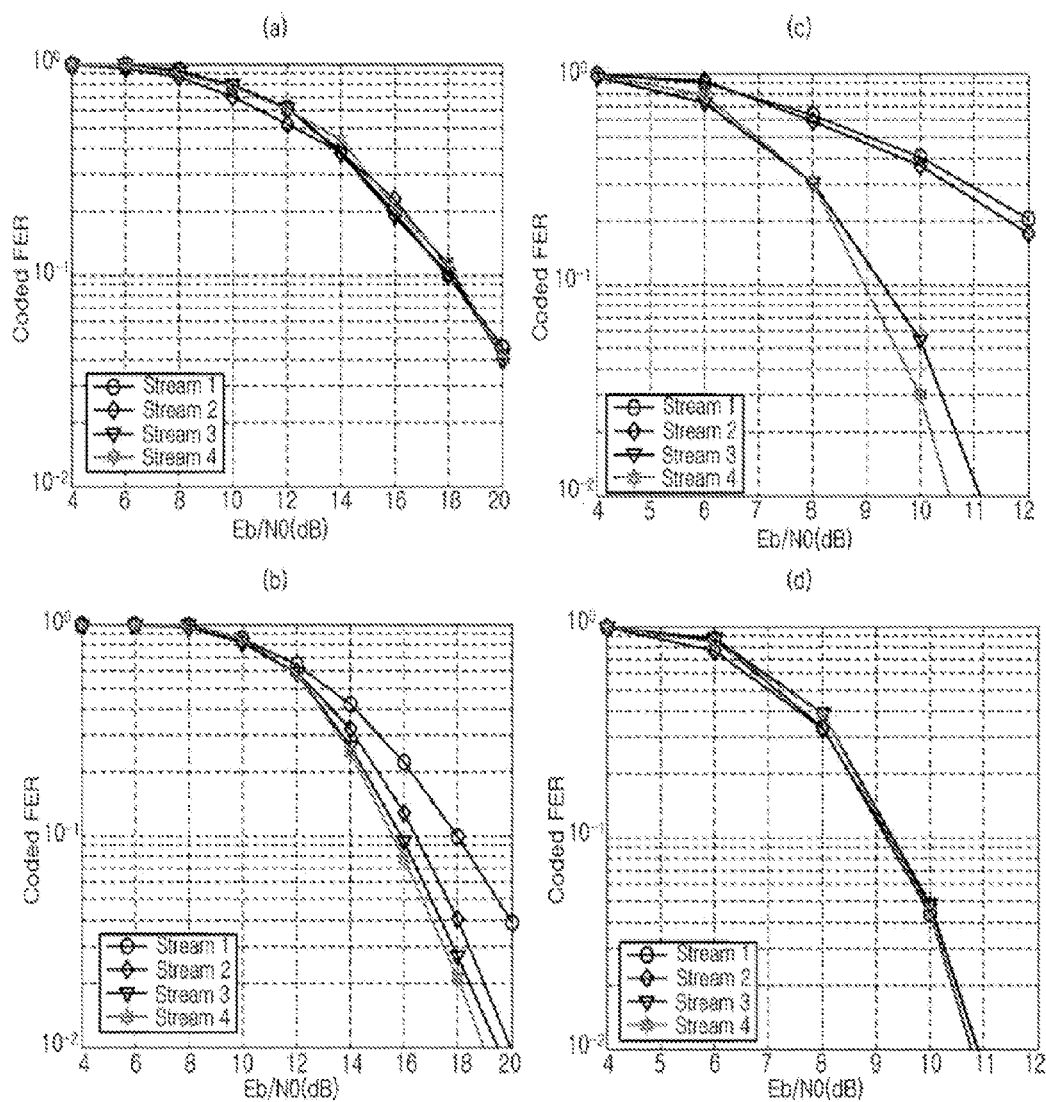
FIG. 8 represents the FER (frame error rate) between stream data for various signal detection techniques.

FIG. 8 represents the FER (frame error rate) between stream data for various signal detection techniques.

FIG. 8*a* represents the performance of an MMSE signal detection technique, and there is no difference in performance between data streams. However, the MMSE-OSIC signal detection technique of FIG. 8*b* and the QRM-MLD technique of FIG. 8*c* cause great differences in error performance between stream data.

FIG. 8*d* represents the error performance between stream data according to an embodiment of the invention. From this, it can be seen that the present invention provides similar error performance between stream data.

An embodiment of the invention can generate LLRs for all bits, using all transmittable symbols for multiple data streams at least once. Also, by applying the partial symbol remover unit 302 once to all data streams and applying the partial symbol detector unit 304 to each data stream, the performance can be made similar for all data streams.

Thus, there may not be a problem of difference in error performance between data streams, as occurs in existing OSIC signal detection techniques, QRM-MLD techniques, or SD techniques.

Figure 9:
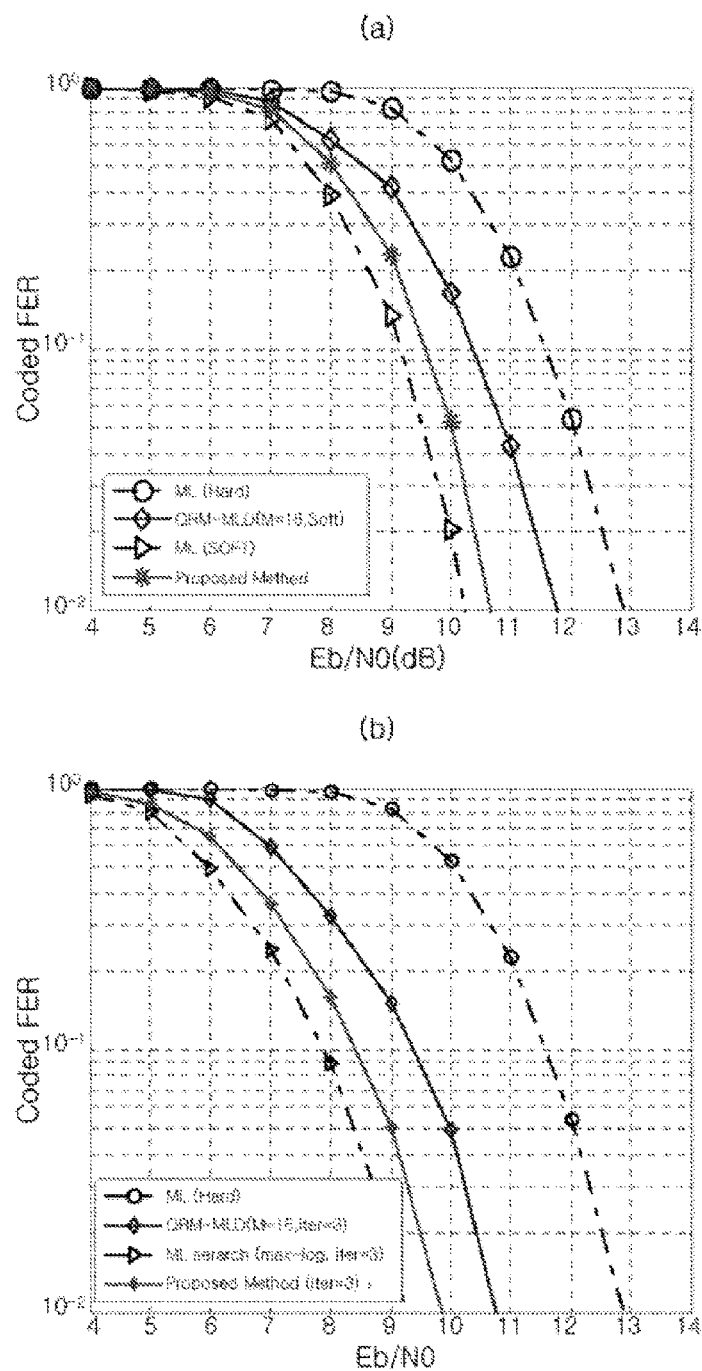
FIG. 9 represents the error performance for signal detection in the case of a soft decision according to an embodiment of the invention.

FIG. 9a represents the error performance results for a soft decision when using a Viterbi decoder, and FIG. 9b represents the error performance results for a soft decision when using a turbo decoder. These results show that there is improved performance compared to QRM-MLD, an existing quasi-optimal signal detection technique, and that there is a performance difference of less than 1 dB compared to the optimal performance ML search (max-log) method.

Thus, the signal detection technique according to an embodiment of the invention can be highly effectively applied to MIMO systems using spatial multiplexing and to multi-user systems using collaborative spatial multiplexing. It can also be applied effectively to the subcarrier of OFDM symbols in a MIMO-OFDM system using spatial multiplexing.

While the spirit of the invention has been described in detail with reference to particular embodiments, the embodiments are for illustrative purposes only and do not limit the invention. It is to be appreciated that those skilled in the art can make various changes, modifications, and additions to the embodiments without departing from the spirit and scope of the invention and that such changes, modifications, and additions are encompassed by the scope of claims appended below.

The invention claimed is:

1. A signal detection apparatus for a single receiver unit equipped with a plurality of antennas in a system having at least one transmitter unit configured to transmit data streams by spatial multiplexing, the signal detection apparatus comprising:
a partial linear coefficient generator unit configured to generate a linear weighting matrix by using a preset algorithm on a channel matrix formed between the transmitter unit and the single receiver unit;
a partial symbol remover unit configured to generate a first symbol vector by removing all transmittable symbols for each transmitting antenna from all received data streams; and
a partial symbol detector unit configured to generate a transmission symbol candidate vector by using the linear weighting matrix and the first symbol vector,
wherein the partial linear coefficient generator unit generates the linear weighting matrix using at least one of a ZF (zero-forcing) algorithm and an MMSE (minimum mean square error) algorithm.

2. The signal detection apparatus of claim 1, wherein the partial linear coefficient generator unit comprises:
a column matrix remover unit configured to generate M−1 partial matrices (where M is a total number of antennas of the at least one transmitter unit) by removing each column matrix of the channel matrix; and
a linear weighting matrix generator unit configured to generate the linear weighting matrix by applying the partial matrices to the preset algorithm.

3. The signal detection apparatus of claim 1, wherein the partial symbol remover unit selects a transmittable symbol of an i-th transmitting antenna, multiplies the selected symbol with a column matrix corresponding to the i-th transmitting antenna from among the channel matrix, and removes the multiplied value from all of the data streams.

4. The signal detection apparatus of claim 3, wherein the partial symbol remover unit selects a number of symbols corresponding to a modulation order of a data stream in the i-th transmitting antenna.

5. The signal detection apparatus of claim 1, wherein the partial symbol remover unit removes all transmittable symbols for each transmitting antenna according to equations shown below:

$$\bar{y}_i(k) = y - h_i C_i(k),\ i = 1, 2, 3, 4,\ k = 1, 2, \cdots, |C_i|,$$

$$h_i = \begin{bmatrix} h_{1i} \\ h_{2i} \\ h_{3i} \\ h_{4i} \end{bmatrix}$$

wherein i is an index for a transmission symbol, k is an index for a modulation order $C_i$, and
$\bar{y}_i(k)$ is a symbol vector with a k-th symbol removed from all symbols transmittable over an i-th transmitting antenna in all of the data streams.

6. The signal detection apparatus of claim 1, wherein the partial symbol detector unit multiplies the linear weighting matrix with the first symbol vector to detect a second symbol vector, the second symbol vector corresponding to symbols remaining after the partial symbol remover unit removes symbols for an i-th transmitting antenna.

7. The signal detection apparatus of claim 6, wherein the partial symbol detector unit detects the second symbol vector for each transmitting antenna according to equations shown below:

$$\hat{x}_{p,i}(k), H_i^+ \bar{y}_i(k),\ i=1,2,3,4,\ k=1,2,\ldots,|C_i|$$

$$\hat{x}_{p,i}(k)=[\hat{x}_{p,1,1}(k)\hat{x}_{p,1,2}(k)\hat{x}_{p,1,3}(k)]$$

wherein $\hat{x}_{p,i}(k)$ is a symbol vector remaining after removing a symbol k that is transmittable over an i-th transmitting antenna.

8. The signal detection apparatus of claim 6, wherein the partial symbol detector unit generates a transmission symbol candidate vector by adding the first symbol vector and second symbol vector.

9. The signal detection apparatus of claim 6, wherein the partial symbol detector unit selects a modulation slicer corresponding to a modulation order of a data stream for each transmitting antenna.

10. The signal detection apparatus of claim 6, further comprising:
a squared Euclidean distance computing unit configured to perform a preset number of squared Euclidean distance computations by using the generated transmission symbol candidate vector.

11. The signal detection apparatus of claim 10, wherein the squared Euclidean distance computations are performed according to equations shown below:

$$SED_i(k)=\|y-H\hat{x}_i(k)\|^2,\ i=1,2,3,4,\ k=1,2,\ldots,|C_i|.$$

12. The signal detection apparatus of claim 10, further comprising:
a minimum squared Euclidean selector unit configured to determine a transmission candidate symbol vector having a shortest distance value from among a preset number of squared Euclidean distances as a transmission symbol according to equations shown below, during a hard decision:

$$\hat{x} = \arg\min_{x \in \hat{x}_i(k)} \|y - Hx\|^2.$$

13. The signal detection apparatus of claim 10, further comprising:
a bit LLR generator unit configured to generate LLR (log-likelihood ratio) values of all bits of the transmission symbol candidate vector, during a soft decision.

14. The signal detection apparatus of claim 13, wherein the generated LLR values are transferred to a channel decoder, the channel decoder comprising at least one of a Viterbi decoder and a turbo decoder.

15. The signal detection apparatus of claim 13, wherein an input of the signal detection apparatus comprises at least one of a channel gain, stream data received at each of the plurality of antennas, and an estimated noise variance value.

16. The signal detection apparatus of claim 1, wherein the at least one transmitter unit is one of a single transmitter unit having an M number of antennas (M is a natural number of 2 or more) and multiple transmitter units each having one or more antennas and having an M number of antennas in total.

17. A method of detecting signals for a single receiver unit equipped with a plurality of antennas in a system having at least one transmitter unit configured to transmit data streams by spatial multiplexing, the method comprising:
(a) generating a linear weighting matrix by using a preset algorithm on a channel matrix formed between the at least one transmitter unit and the single receiver unit;
(b) generating a first symbol vector by removing all transmittable symbols for each transmitting antenna from all received data streams;
(c) generating a transmission symbol candidate vector by using the generated linear weighting matrix and the first symbol vector; and
(d) computing a squared Euclidean distance by using the generated transmission symbol candidate vector,
wherein the step (a) generates the linear weighting matrix using at least one of a ZF (zero-forcing) algorithm and an MMSE (minimum mean square error) algorithm.

\* \* \* \* \*